United States Patent
Gotfried

(10) Patent No.: US 7,018,084 B2
(45) Date of Patent: Mar. 28, 2006

(54) LIGHTING DISPLAY SYSTEM

(76) Inventor: Bradley L. Gotfried, 8949 SE. Bridge Rd., Hobe Sound, FL (US) 33455

( * ) Notice: Subject to any disclaimer, the term of this patent is extended or adjusted under 35 U.S.C. 154(b) by 0 days.

(21) Appl. No.: 10/424,250

(22) Filed: Apr. 28, 2003

(65) Prior Publication Data

US 2004/0213020 A1  Oct. 28, 2004

(51) Int. Cl.
*F21S 8/00* (2006.01)

(52) U.S. Cl. .................. 362/576; 362/153; 362/552

(58) Field of Classification Search ............. 362/576, 362/153, 552, 555, 551, 800, 145, 153.1, 362/554, 556, 583, 559; 404/22
See application file for complete search history.

(56) References Cited

U.S. PATENT DOCUMENTS

| | | | |
|---|---|---|---|
| 3,168,617 A | 2/1965 | Richter | |
| 3,681,164 A | 8/1972 | Bazinet, Jr., et al. | |
| 3,881,976 A | 5/1975 | Jones | |
| 4,234,907 A | 11/1980 | Daniel | |
| 4,329,739 A | 5/1982 | Loebner | |
| 4,340,929 A | 7/1982 | Konikoff et al. | |
| 4,425,601 A | 1/1984 | Donahue | |
| 4,521,205 A | 6/1985 | Spector | |
| 4,597,030 A | 6/1986 | Brody et al. | |
| 4,631,675 A * | 12/1986 | Jacobsen et al. | ............. 700/90 |
| 4,752,114 A | 6/1988 | French | |
| 4,754,372 A * | 6/1988 | Harrison | .................... 362/565 |
| 4,807,095 A | 2/1989 | Bell | |
| 4,884,865 A | 12/1989 | Grise | |
| 5,550,946 A | 8/1996 | Muehlemann et al. | |
| 6,078,704 A | 6/2000 | Bischel et al. | |
| 6,082,886 A | 7/2000 | Stanford | |
| 6,149,283 A | 11/2000 | Conway et al. | |
| 6,150,774 A | 11/2000 | Mueller et al. | |
| 6,195,016 B1 * | 2/2001 | Shankle et al. | ........ 340/815.42 |
| 6,198,872 B1 | 3/2001 | Lipson et al. | |
| 6,204,778 B1 | 3/2001 | Bergan et al. | |
| 6,241,362 B1 | 6/2001 | Morrison | |
| 6,398,399 B1 * | 6/2002 | Neophytou | ................. 362/576 |
| 6,430,605 B1 | 8/2002 | Hunter | |
| 2002/0097978 A1 | 7/2002 | Lowry et al. | |
| 2002/0116717 A1 | 8/2002 | Eller et al. | |
| 2002/0159275 A1 | 10/2002 | Nicholls et al. | |
| 2004/0057251 A1 * | 3/2004 | Isaacson et al. | ............ 362/555 |

* cited by examiner

*Primary Examiner*—John Anthony Ward
*Assistant Examiner*—Bao Q. Truong
(74) *Attorney, Agent, or Firm*—Akerman Senterfitt

(57) ABSTRACT

The present invention concerns a lighting display system. The system includes at least one non-transparent cable for transmitting light, at least one light emitting diode disposed at a first end of at least a portion of the non-transparent cables, a light emitting controller to control the intensity of light emanating from the light emitting diodes and receiving structure for receiving a second end of at least a portion of the non-transparent cables. At least a portion of the second ends of the non-transparent cables emit light from the light emitting diodes. The receiving structure is incorporated into infrastructure, and the system displays at least one design. In one arrangement, the design can be an advertisement or can simulate a floor covering, and the floor covering to be simulated can be carpeting. The infrastructure can be a travelway that supports at least one of vehicular traffic and pedestrian traffic.

18 Claims, 8 Drawing Sheets

LIGHTING DISPLAY SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The present invention relates generally to lighting systems and more particularly, to fiber optic lighting systems.

2. Description of Related Art

Flooring in most homes and businesses plays an important aesthetic role. Flooring can also increase the value of a structure. As such, many homeowners and businesses spend large sums of money on all types of flooring, such as hardwood floors, tile and carpet. Although contemporary flooring systems are built and designed to last many years following installation, certain systems are susceptible to wear and tear. For example, carpeting is made up of many small fibers that flatten over time, particularly in areas of heavy traffic. Even if a particular flooring system maintains its overall appearance over time, its design or style may go out of fashion. Thus, most homeowners or businesses eventually may wish to replace their flooring.

Most types of flooring, however, are permanent and difficult to replace. For example, replacing a tile floor involves removing each of the original tiles, the grout and the bonding agent used to secure the tiles in place. As a result, supplanting many types of flooring is prohibitively expensive. Accordingly, what is needed in the art is a flooring system capable of maintaining a wide variety of styles and designs without the need for continual replacement or renovation.

SUMMARY OF THE INVENTION

The present invention concerns a lighting display system. The system includes at least one non-transparent cable for transmitting light, at least one light emitting diode disposed at a first end of at least a portion of the non-transparent cables, a light emitting controller to control the intensity of light emanating from the light emitting diodes and receiving structure for receiving a second end of at least a portion of said non-transparent cables. At least a portion of the second ends of the non-transparent cables emit light from the light emitting diodes. Additionally, the receiving structure is incorporated into infrastructure, and the system displays at least one design. In one arrangement, the design can be an advertisement or a floor covering, and the floor covering to be simulated can be carpeting. The non-transparent cable can be a fiber optic cable, and the infrastructure can be a travelway that supports at least one of vehicular traffic and pedestrian traffic.

In another arrangement, the light emitting controller can include a central microprocessor that is programmed with the design to be displayed by the lighting display system. Further, the light emitting controller can include a port for receiving data from a communications network thereby permitting the central microprocessor to receive data from a remote location. As an example, the communications network can be the Internet, and the data received by the central microprocessor can be transmitted from a computer connected to the Internet.

In another arrangement of the system, at least three light emitting diodes can be disposed at a first end of each non-transparent cable. Light emitted from the three light emitting diodes can combine to form at least one of a plurality of colors. Moreover, the receiving structure that receives the second ends of the non-transparent cables can be at a location remote to the first ends of the non-transparent cables.

DETAILED DESCRIPTION OF THE PREFERRED EMBODIMENTS

Figure 1:
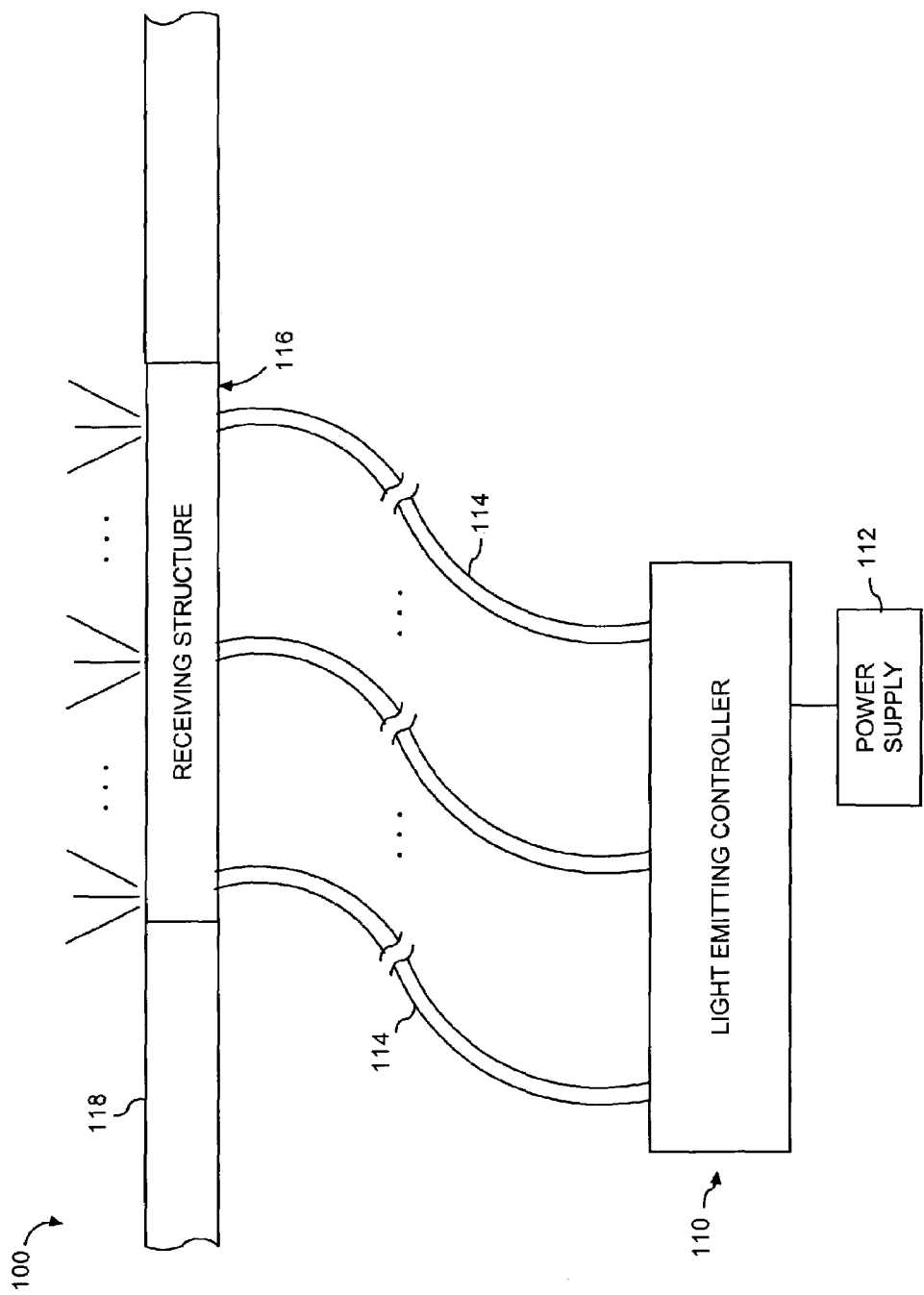
FIG. 1 illustrates a lighting display system in accordance with the inventive arrangements.

Referring to FIG. 1, a lighting display system 100 is illustrated. The system 100 can include a light emitting controller 110, a power supply 112 coupled to the light emitting controller 110, one or more non-transparent cables 114 for transmitting light and a receiving structure 116. Although FIG. 1 shows the system 100 as containing only three non-transparent cables 114, the system 100 can contain any suitable number of non-transparent cables 114, a feature that is represented by the sequence of dots between the cables 114 that are illustrated. The non-transparent cables 114 can be coupled to the light emitting controller 110 and the receiving structure 116 such that the non-transparent cables 114 transmit light from the light emitting controller 110 to the receiving structure 116. The light emitting controller 110 can control the light being transmitted by the non-transparent cables 114. As shown in FIG. 1, light transmitted by the non-transparent cables 114 can be emitted at the receiving structure 116.

Figure 2:
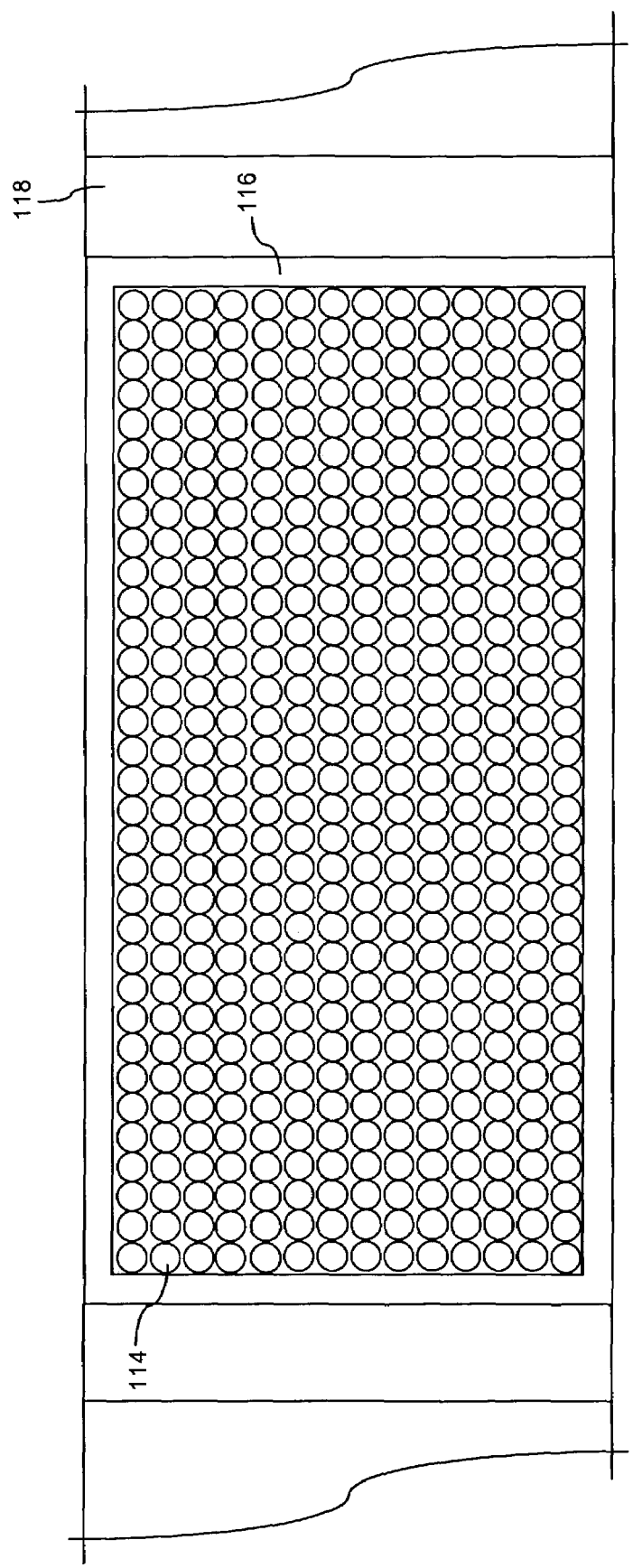
FIG. 2 illustrates a receiving structure in accordance with the inventive arrangements.

The receiving structure 116 can be incorporated into an infrastructure 118. As an example, the infrastructure 118 can be a travelway that supports either vehicular traffic, pedestrian traffic or a combination of the two. The infrastructure 118 can also be an exterior or an interior wall. A top view of one example of a receiving structure 116 integrated into an infrastructure 118 is shown in FIG. 2. The top view of the non-transparent cables 114 received by the receiving structure 116 is also shown. In this example, the infrastructure 118 is a sidewalk, and the receiving structure 116 can support pedestrian traffic moving along the sidewalk. It is understood, however, that the invention is not limited to this particular example.

In one embodiment and referring to FIGS. 1 and 2, the receiving structure 116 can be at a location that is remote to the light emitting controller 110. For example, the receiving structure 116 can be built into a floor of a building, and the light emitting controller 110 can be positioned in a maintenance room located on another floor. Such an arrangement can permit one or more light emitting controllers 110 in a central location to control the light being transmitted to a plurality of receiving structures 116 located on separate floors. Alternatively, the light emitting controller 110 and the receiving structure 116 can be integrated into a single unit in which the non-transparent cables 114 can be relatively short. It is understood, however, that the invention is in no way limited to these examples.

The system 100 can be used to display one or more designs. As will be explained later, the light emitting controller 110 can contain suitable software and circuitry for controlling the intensity and the color of the light transmitted by the non-transparent cables 114. As this light is emitted, a user or passerby will see any number of designs being displayed at the receiving structure 116. For example, the receiving structure 116 can be built into a flooring surface intended to carry pedestrian traffic, and the design to be displayed can be an advertisement or can simulate a floor covering such as simulated carpeting. Of course, the design is not limited to these examples, and more discussion concerning the overall operation of the system 100 will follow.

Figure 3:
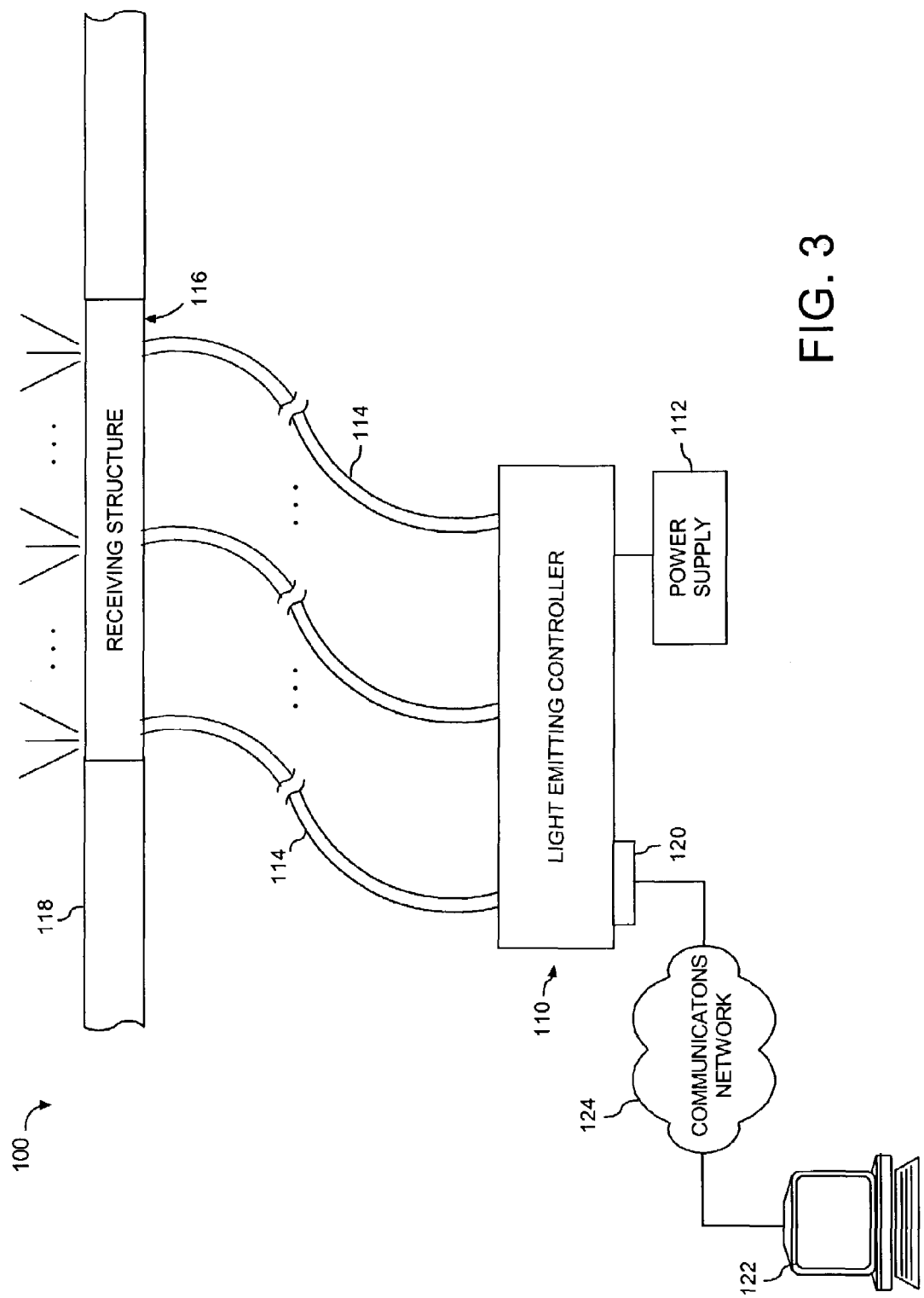
FIG. 3 illustrates the lighting display system of FIG. 1 controlled from a remote location in accordance with the inventive arrangements.

Referring to FIG. 3, the light emitting controller 110 can include a port 120 for receiving data from a communications network 124. A computer 122 loaded with suitable software can be coupled to the communications network 124 and can transmit data to the light emitting controller 110 over the communications network 124 and through the port 120. As such, the light emitting controller 110 can receive data from a remote location. In one arrangement, the communications network 124 can be the Internet, although the invention is not limited to this particular example. In addition, the light emitting controller 110 is not limited to the receipt of data from a remote location as shown in FIG. 3, as the light emitting controller 110 can also receive data locally from a computer 122.

Figure 4:
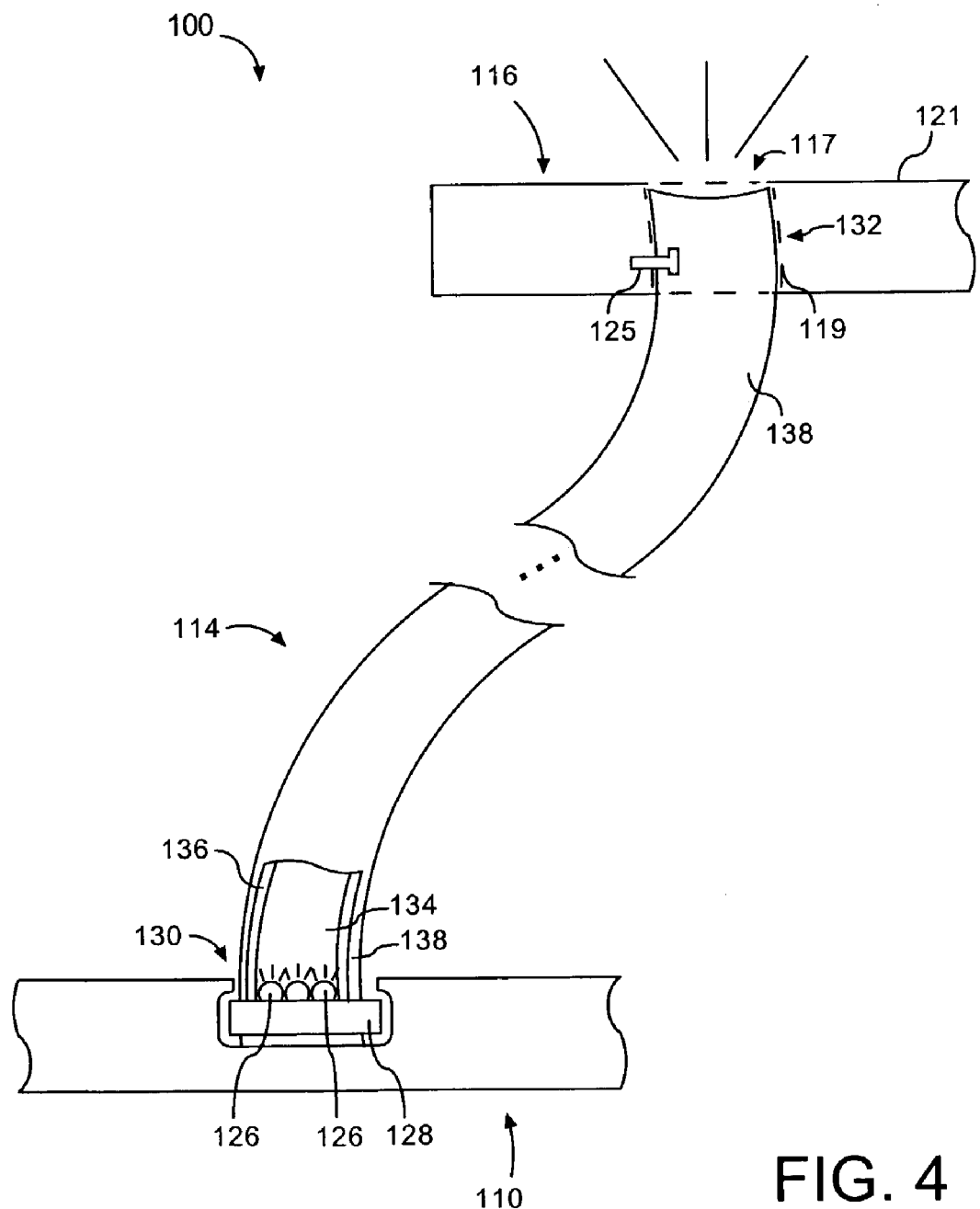
FIG. 4 illustrates a non-transparent cable for transmitting light in accordance with the inventive arrangements.

One example of a non-transparent cable 114 is illustrated in FIG. 4. One or more light emitting diodes (LED) 126 can be disposed at a first end 130 of the non-transparent cable 114. The non-transparent cable 114 can transmit the light emitted from the LEDs 126 to the receiving structure 116, where the light can be emitted from a second end 132 of the non-transparent cable 114. Although FIG. 4 shows three LEDs 126, it is understood that any suitable number of LEDs 126 can be disposed at the first end 130 of the non-transparent cable 114. The LEDs 126 can be positioned on a base 128, which can be part of the light emitting controller 110.

In one arrangement, the non-transparent cable 114 can be a fiber optic cable having a core 134 made of glass or transparent plastic, a layer of cladding 136 wrapped around at least a portion of the core 134 and a buffer coating 138 wrapped around at least a portion of the cladding 136. As those of ordinary skill in the art will appreciate, the cladding 136 serves to reflect the light transmitted along the core 134 back into the core 134, and the buffer coating 138 can protect the non-transparent cable 114 from damage or moisture. It is understood, however, that the system 100 is not limited to the use of fiber optic cables, as any other suitable cable that can transmit light to the receiving structure 116 with relatively little leakage can be used with the invention.

In one arrangement, three LEDs 126 can be disposed at the first end 130 of the non-transparent cable 114 with each LED 126 constructed to emit a separate colored light. For example, each LED 126, when forward biased, can emit a different one of the three primary colors of the visible electromagnetic spectrum, i.e., red, green and blue. As is known in the art, the intensity of primary colored light emitted from each LED 126 can be modified. By varying the amount of primary colored light emitted from each LED 126, the LEDs 126, in combination, can be used to generate light of virtually any color in the visible spectrum. The circuitry for controlling the LEDs 126 will be described later. It is understood, however, that the invention is not limited to this particular arrangement. For example, all the LEDs 126 can be constructed to emit similarly colored light. In addition, only one or two LEDs 126 may be disposed at the end 130 of the non-transparent cable 114 for emitting less than all the primary colors or any other suitable colored light. Additionally, more than three LEDs 126 may be employed, each of which may be constructed to emit any type of colored light.

The receiving structure 116 can include one or more apertures 117 for receiving the second ends 132 of at least a portion of the non-transparent cables 114. Each of the apertures 117 of the receiving structure 116 can include an inner surface 119, and the receiving structure 116 can have a top surface 121, which can include any surface area located between the apertures 117. In one arrangement, the top surface 121 of the receiving structure 116 can rise slightly above the tops of the non-transparent cables 114 or to a level substantially level with the tops of the non-transparent cables 114 so as to bear the brunt of the compressive forces generated by any traffic passing over the receiving structure 116.

The apertures 117 can have a diameter in which the inner surface 119 of the aperture 117 can directly contact the buffer coating 138 of the second end 132. The second ends 132 of the non-transparent cables 114 can be held in place by the friction produced by the contact between the inner surface 119 of each of the apertures 132 the buffer coating 138. In addition, any suitable structure or composition can be used to supplement this contact to help hold the non-transparent cables 114 in place.

For example, an adhesive may be applied to at least a portion of the inner surface 119 of the aperture 117 and also to at least a portion of the buffer coating 138 of the second end 132 of the non-transparent cable 114. When the non-transparent cable 114 is set, the adhesive can supplement the contact between the buffer coating 138 and the inner surface 119. As another example, one or more fastening structures 125, such as screws or nails, may be used to secure the second ends 132 of the non-transparent cable 114 to the inner surface 119.

Figure 5:
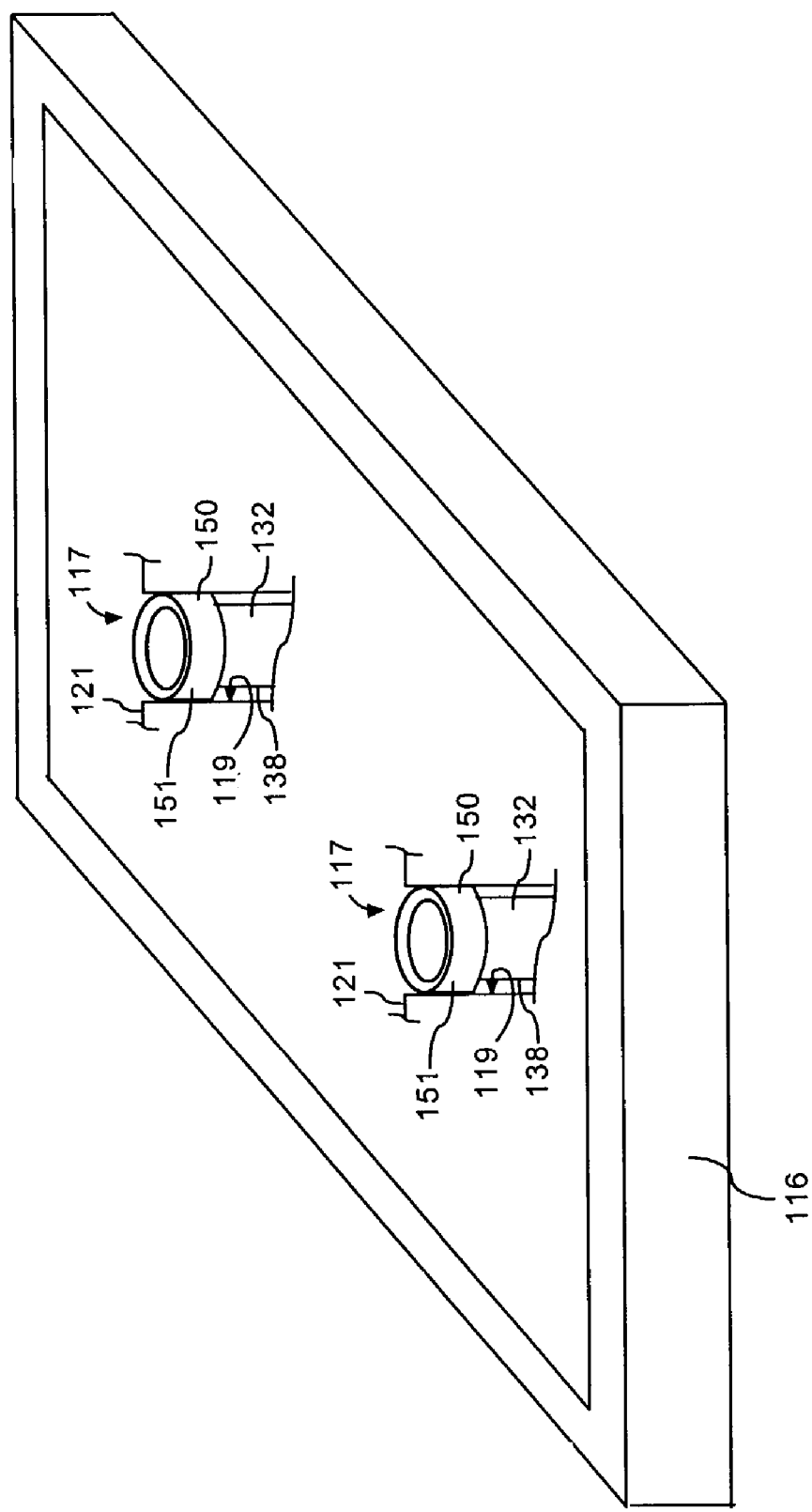
FIG. 5 illustrates a receiving structure for supporting pedestrian or vehicular traffic in accordance with the inventive arrangements.

Suitable structure may be used to improve the ability of the non-transparent cables 114 to support foot or vehicular traffic, in addition to the top surface 121 of the receiving structure 116. For example, referring to FIG. 5, a rigid enclosure 150 of a suitable thickness can be wrapped substantially around the second ends 132 over the buffer coating 138 of one or more of the non-transparent cables 114. For purposes of clarity, only a few of the non-transparent cables 114 having the rigid enclosures 150 and a portion of the top surface 121 are shown. The rigid enclosure 150 can have a shape that substantially matches the shape of the second end 132 of each non-transparent cable 114 around which the enclosure 150 will be positioned. It must be noted, however, that the rigid enclosure 150 is not so limited, as the enclosure 150 can have any other suitable shape. The rigid enclosure 150 can be constructed of any suitable material capable of withstanding deformation when placed under varying amounts of weight. Examples include steel, metal alloys or plastic.

The rigid enclosure 150 can include an outside surface 151 that can engage the inner surface 119 of the aperture 117. The outer surface 151 of the rigid enclosure 150 can be secured to the inner surface 119 of the aperture 117 in ways similar to those discussed in relation to FIG. 4. Specifically, the outside surface 151 can be bonded or fastened to the inner surface 119 with an adhesive or a fastening structure. In an alternative arrangement, the outer surface 151 can be welded to the inner surface 119. It is understood, however, that the invention is not limited to these examples, as any other suitable device, composition or process may be used to supplement the engagement of the second ends 132 (with or without the rigid enclosure 150) with the inner surface 119 of the apertures 117 of the receiving structure 116.

Figure 6:
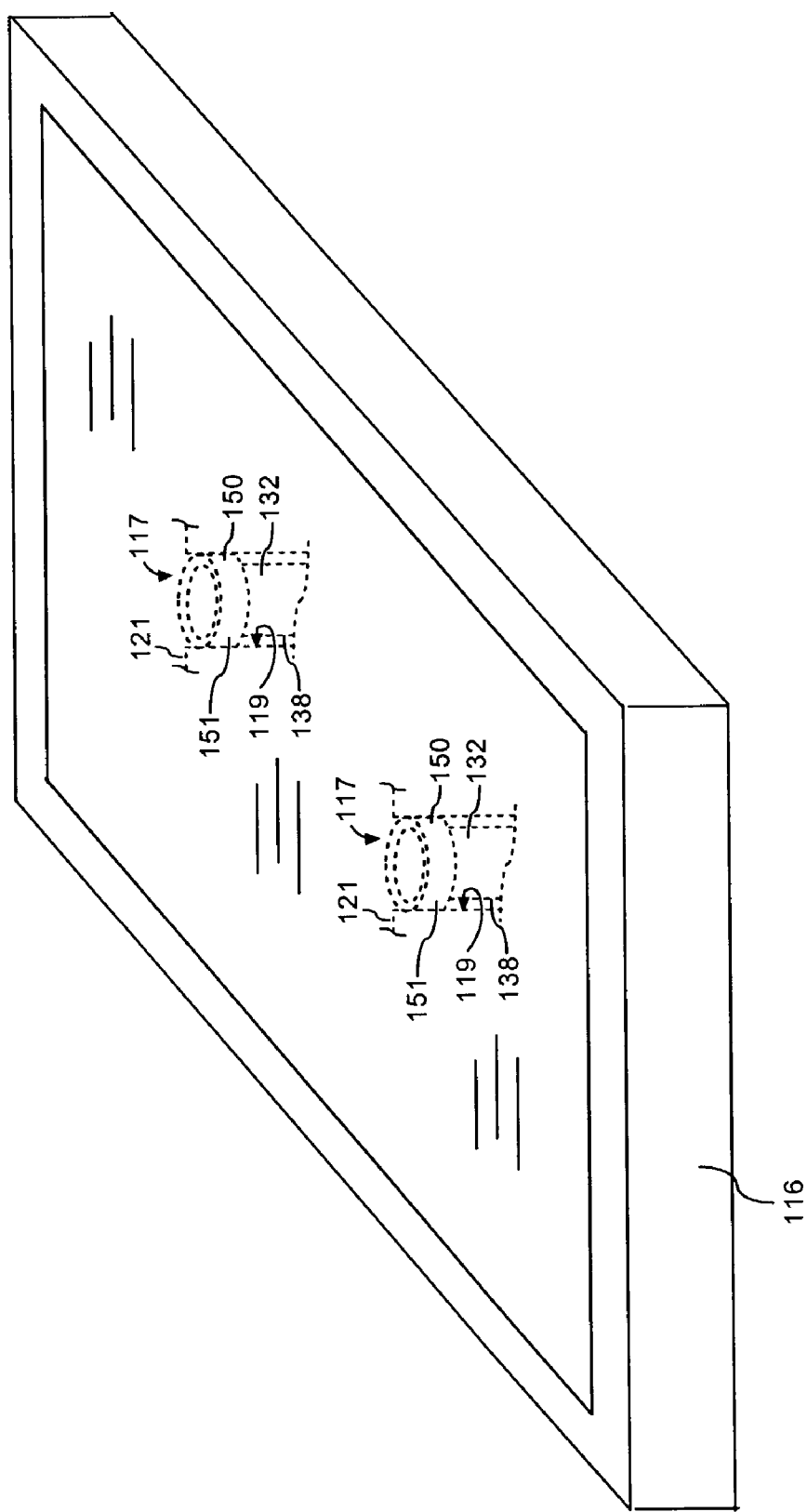
FIG. 6 illustrates another receiving structure for supporting pedestrian or vehicular traffic in accordance with the inventive arrangements.

In an alternative arrangement and referring to FIG. 6, a substantially transparent, rigid sheet 152 may be mounted to the receiving structure 116 and placed over the second ends 132 of the non-transparent cables 114 and the top surface 121 of the receiving structure 116. Again, only a portion of the non-transparent cables 114 and a portion of the top surface 121 are illustrated here. The non-transparent cables 114 and the other associated components are represented with a dashed outline to indicate their positioning under the rigid sheet 152. As an example, the rigid sheet 152 can be plexiglass of a thickness suitable for supporting pedestrian or vehicular traffic. In this arrangement, the positioning of rigid enclosures 150 around the second ends 132 of the non-transparent cables 114 is optional.

Figure 7:
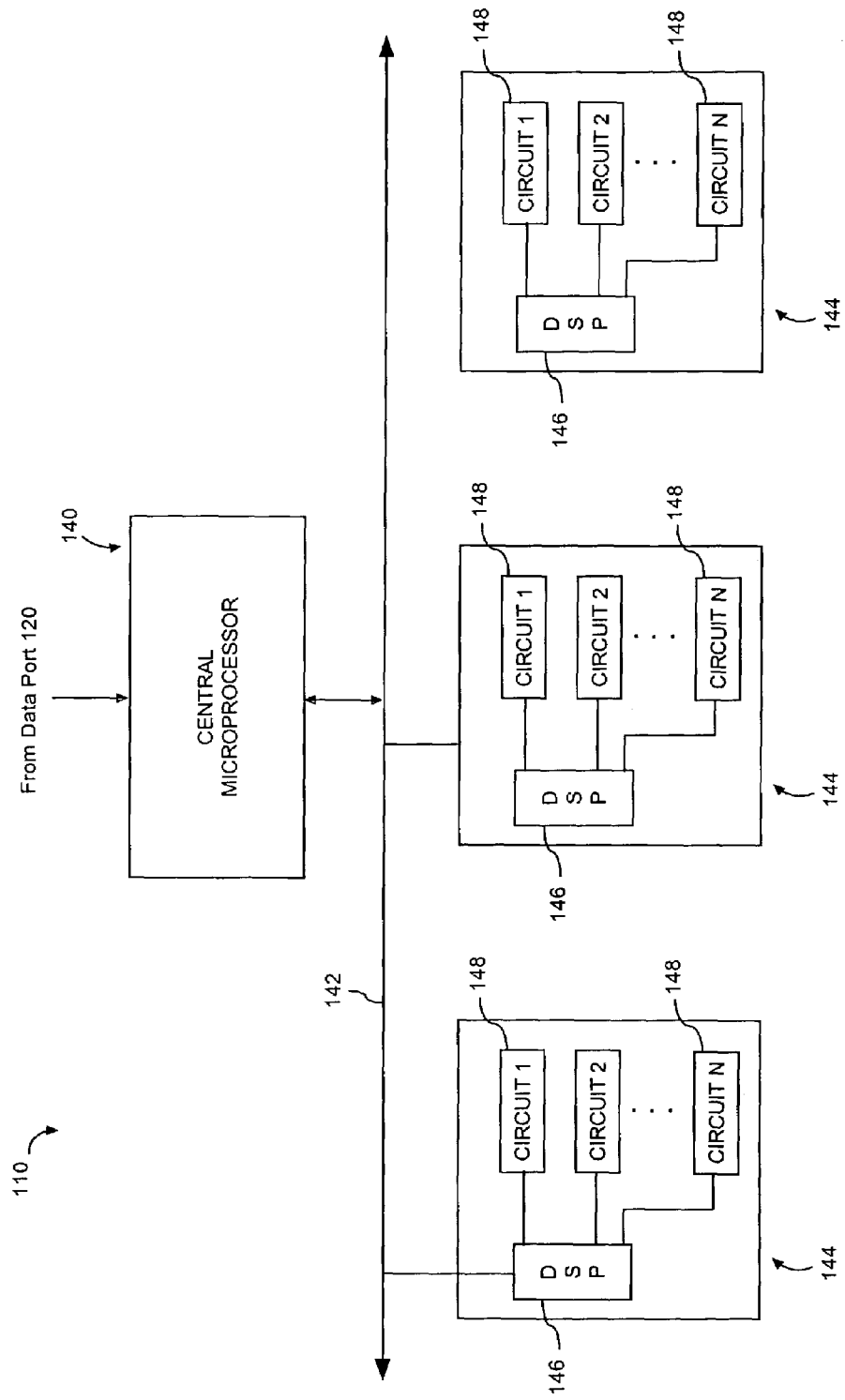
FIG. 7 illustrates an example of a portion of a light emitting controller in accordance with the inventive arrangements.

Referring to FIG. 7, certain components of the light emitting controller 110 for controlling the intensity of the light emitted from the LEDs 126 (see FIG. 4) are shown. Specifically, the light emitting controller 110 can include a central microprocessor 140, a bus 142 and one or more cards 144. The central microprocessor 140 and each of the cards 144 can be coupled to the bus 142, which can be, for example, a thirty-two bit bus. Nevertheless, other bus sizes may be used with the invention. The cards 144 can contain the circuitry required to control the light being emitted from each of the LEDs 126 (see FIG. 4). In one arrangement, each card 144 can include a digital signal processor 146 and one or more circuits 148. Each of the circuits 148 on a particular card 144 can be coupled to the digital signal processor 146, which can transmit pulse width modulated signals to the circuits 148 to enable the selective forward biasing of the LEDs 126 (see FIG. 4).

In one arrangement, the central microprocessor 140 can be programmed with one or more designs to be displayed at the receiving structure 116 (see FIG. 1). Examples of suitable designs include advertisements or digitally generated pictures or animation. As another example, the central microprocessor 140 may be programmed with a simple design, such as a solid color, that could be displayed to simulate a floor covering such as carpeting. Once loaded with the designs, the central microprocessor 140 can be programmed to cause the display of the designs in accordance with a predetermined or random order.

In another arrangement and referring to FIGS. 3 and 7, the central microprocessor 140 can be coupled to the data port 120 to enable a user at a remote or local location to send data to the light emitting controller 110 and the central microprocessor 140. For example, the computer 122 can be loaded with suitable software to permit a user to select a particular design to be displayed at the receiving structure 116. The user's selection can be transmitted from the computer 122 to the light emitting controller 110 and the central microprocessor 140 over the communications network 124 and through the port 120. In response, the central microprocessor 140 can cause the selected design to be displayed at the receiving structure 116.

Figure 8:
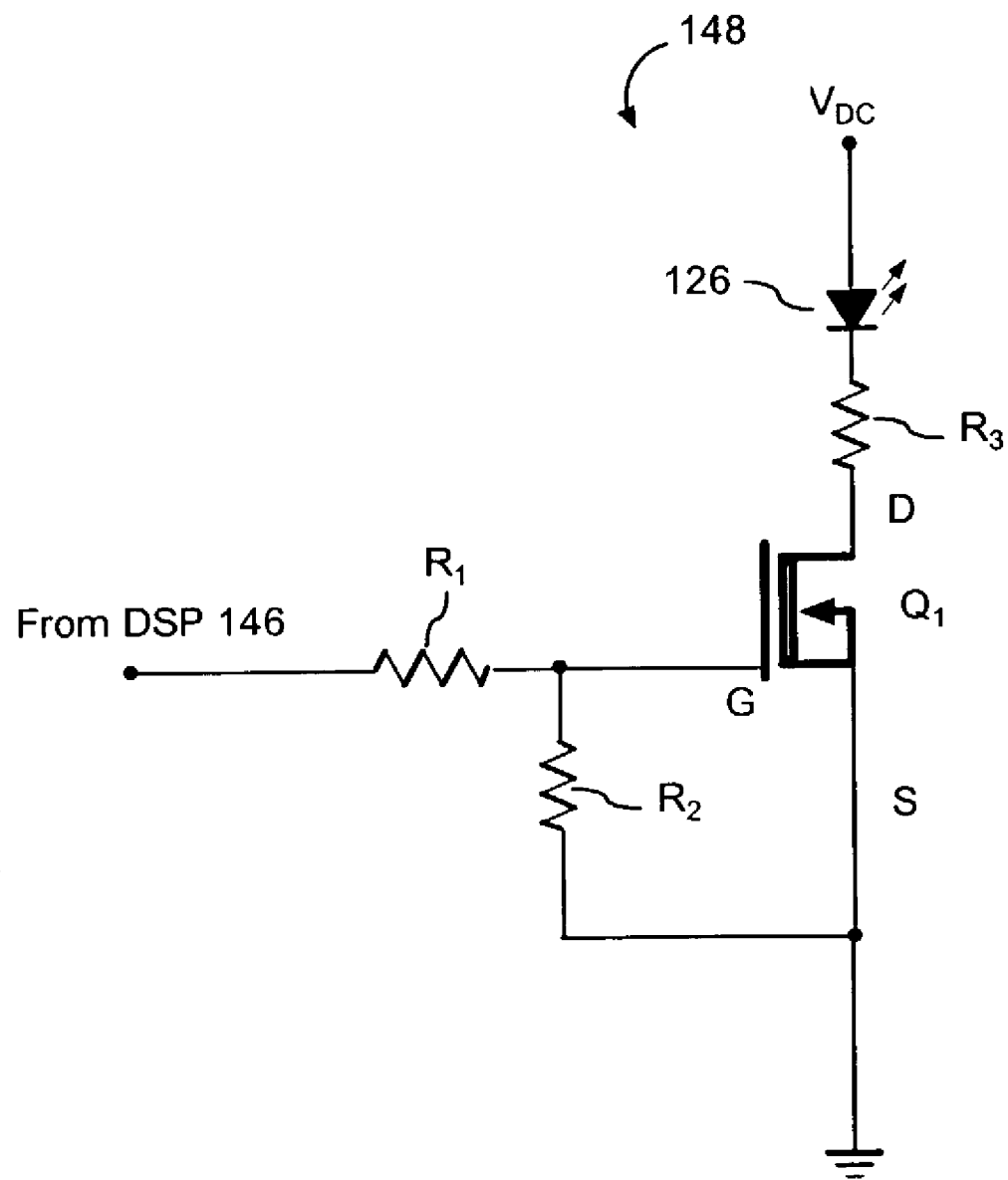
FIG. 8 illustrates a circuit for selectively forward biasing a light emitting diode in accordance with the inventive arrangements.

Referring to FIG. 8, an example of a suitable circuit 148 for selectively activating the LEDs 126 is shown. The circuit 148 can include resistors $R_1$ and $R_2$, a current-limiting resistor $R_3$, a transistor $Q_1$ and one or more of the LEDs 126. When the transistor $Q_1$ is turned on, current can flow through the LED 126 thereby causing the LED 126 to emit light. The circuit 148 can receive a pulse width modulated input from the digital signal processor 146 (see FIG. 7), which can serve as a gate drive input signal to the transistor $Q_1$. It is this gate drive input signal that can be used to vary the intensity of the light emitted by the LED 126. Resistor $R_3$ can limit the amount of current flowing through the LED 126 to protect the LED 126 from damage.

Referring to FIGS. 7 and 8, the overall operation for controlling the intensity of the light emitted by the LEDs 126 will now be explained. Based on the design to be displayed, the central microprocessor 140 can transmit signals over the bus 142 to the appropriate digital signal processors 146. The digital signal processors 146 process the signals from the central microprocessor 140 and signals each of the appropriate circuits 148 with a pulse width modulated signal. As noted earlier, the signals from the digital signal processors 146 serve as gate drive input signals for the transistor $Q_1$. The duty cycle of the gate drive input signal can determine the intensity of the light emitted by the LED 126. For example, a higher duty cycle causes the intensity of the emitted light to be higher, whereas a lower duty cycle causes the intensity to drop. Thus, the design to be displayed determines the duty cycle for each particular gate drive input signal and, hence, the intensity of each of the LEDs 126.

As noted earlier, each of the non-transparent cables 114 can combine to form a display. As an example, and referring to FIGS. 2, 4, 7 and 8, one green LED 126, one red LED 126 and one blue LED 126 can be disposed at the first end 130 of the non-transparent cable 114, and the central microprocessor 140 can be programmed with a design that will cause each of the non-transparent cables 114 to emit green light. In accordance with the inventive arrangements, the central microprocessor 140 can signal the appropriate digital signal processors 146. In response, the duty cycle for the gate drive input signals for the circuits 148 used to turn on the red and blue LEDs 126 can be approximately zero, which will prevent these LEDs 126 from emitting light. In contrast, the duty cycle for the input signals to those circuits 148 used to turn on the green LEDs 126 can be high, which will cause these LEDs 126 to emit green light at a relatively high intensity. As such, a user viewing the receiving structure 116 will see green light being emitted from each of the non-transparent cables 114.

Those of ordinary skill in the art will appreciate that the invention is in no way limited to this particular example. Notably, the LEDs 126 can be selectively controlled to display many other colors and far more complex designs. For example, to display a magenta color, red and blue LEDs 126 can be turned on (with the duty cycle of the input signal being relatively high), and the green LEDs 126 can be turned off. In addition, each of the green, red and blue LEDs 126 can be turned on with each of the intensities of their emitted light being dependent on the duty cycle of the gate drive input signals. Because each individual LED 126 can be controlled through a separate circuit, different portions of the plurality of non-transparent cables 114 can combine to display the complex designs. As a result, if the receiving structure 116 is built into a floor, for example, a user may use the receiving structure 116 and the non-transparent cables 114 to simulate a floor covering such as carpeting in which the appearance of the carpeting can assume many different styles or designs.

As noted earlier, the invention can also be used to display advertisements. Specifically, the central microprocessor 140 can be programmed with an advertisement, and the advertisement can be displayed in accordance with the above discussion. The advertisement can be displayed on a continuous basis or can be shown for a predetermined amount of time. If the receiving structure 116 is built into a travelway, the advertisement may be directly displayed to individuals walking over the receiving structure 116, which will serve as a highly visible and attractive promotion. The system 100 can be used to display advertisements associated with the owner of the system 100, or alternatively, advertising space can be sold to other parties.

Although the present invention has been described in conjunction with the embodiments disclosed herein, it should be understood that the foregoing description is intended to illustrate and not limit the scope of the invention as defined by the claims.

What is claimed is:

1. A lighting display system, comprising:
   at least one non-transparent cable for transmitting light;
   at least one light emitting diode disposed at a first end of at least a portion of said at least one non-transparent cable;
   a light emitting controller having a digital signal processor that signals said at least one light emitting diode to control the intensity of light emanating from said at least one light emitting diode and to control the color of the light resulting from the combination of light from said at least one light emitting diode; and
   a receiving structure for receiving a second end of at least a portion of said at least one non-transparent cable, wherein at least a portion of said second end of said at least one non-transparent cable emits light from said at least one light emitting diode;
   wherein said structure is incorporated into infrastructure and said system displays at least one design.

2. The system according to claim 1, wherein said at least one design is an advertisement.

3. The system according to claim 1, wherein said at least one design simulates a floor covering when displayed.

4. The system according to claim 3, wherein said floor covering to be simulated is carpeting.

5. The system according to claim 1, wherein said non-transparent cable is a fiber optic cable.

6. The system according to claim 1, wherein said infrastructure is a travelway that supports at least one of vehicular traffic and pedestrian traffic.

7. The system according to claim 1, wherein said light emitting controller includes a central microprocessor that is programmed with said at least one design to be displayed by said lighting display system.

8. The system according to claim 7, wherein said light emitting controller includes a port for receiving data from a communications network thereby permitting said central microprocessor to receive data from a remote location.

9. The system according to claim 8, wherein the communications network is the Internet and said data received by said central microprocessor are transmitted from a computer connected to the Internet.

10. The system according to claim 1, wherein at least three light emitting diodes are disposed at a first end of each non-transparent cable;
    wherein light emitted from said at least three light emitting diodes combines to form at least one of a plurality of colors.

11. The system according to claim 1, wherein said receiving structure that receives said second end of said non-transparent cables is at a location remote to said light emitting controller.

12. A lighting display system, comprising:
    a plurality of non-transparent cables for transmitting light;
    at least one light emitting diode enclosed in a first end of each said non-transparent cable;
    a light emitting controller to control the intensity of light emanating from said at least one light emitting diode; and
    a receiving structure with apertures arranged in an array for receiving a second end of each said non-transparent cable, wherein said second end of said non-transparent cable emits light from said at least one light emitting diode, the array providing for the display of a plurality of designs by selective light emission from said at least one light emitting diode;
    wherein said receiving structure is incorporated into a travelway and said system displays at least one design;
    wherein said travelway supports at least one of vehicular traffic and pedestrian traffic.

13. The system according to claim 12, wherein said at least one design is an advertisement.

14. The system according to claim 12, wherein said at least one design simulates a floor covering when displayed.

15. A lighting display system, comprising:
    at least one non-transparent cable for transmitting light;
    at least one light emitting diode disposed at a first end of at least a portion of said at least one non-transparent cable;
    a light emitting controller to control the intensity of light emanating from said at least one light emitting diode, said light emitting controller including a central processor configured to receive data via the Internet thereby permitting said central microprocessor to receive data from a remote location;
    a computer communicably coupled to the central processor via the Internet that provides data that controls the light emitting controller; and
    a receiving structure for receiving a second end of at least a portion of said at least one non-transparent cable, wherein at least a portion of said second end of said at least one non-transparent cable emits light from said at least one light emitting diode;
    wherein said structure is incorporated into infrastructure and said system displays at least one design.

16. The system according to claim 15, wherein said at least one design is an advertisement.

17. The system according to claim 15, further comprising at least three light emitting diodes, each said light emitting diode providing a distinct color, whereby light emitted from said three light emitting diodes combines to emit a single color dependent upon the intensity of the light emitted by each said light emitting diode.

18. The system according to claim 12, wherein said light emitting controller dynamically adjusts the said at least one design.

* * * * *